United States Patent [19]

Itoh et al.

[11] Patent Number: 5,896,554
[45] Date of Patent: Apr. 20, 1999

[54] STATUS MONITORING APPARATUS FOR CAR RADIO

[75] Inventors: Yoshikazu Itoh; Hiroshi Tanaka; Yoshikazu Aoyama; Tatsuo Asakura, all of Tokyo, Japan

[73] Assignee: K.K. Video Research, Tokyo, Japan

[21] Appl. No.: 08/831,858

[22] Filed: Apr. 2, 1997

[30] Foreign Application Priority Data

Dec. 2, 1996 [JP] Japan .................................. 8-336438

[51] Int. Cl.⁶ .................................................. H04B 17/00
[52] U.S. Cl. .................................................. 455/2; 348/1
[58] Field of Search ........................ 348/1, 2, 34; 455/2, 455/6.3

[56] References Cited

U.S. PATENT DOCUMENTS 5,382,970  1/1995  Kiefl ................................. 348/1
5,826,164  10/1998  Weinblatt ............................ 455/2

Primary Examiner—Nathan Flynn
Attorney, Agent, or Firm—Morrison & Foerster LLP

[57] ABSTRACT

A monitoring apparatus for the use status of a car radio is disclosed. In addition to the function of identifying a radio station to which the car radio is tuned at any given time, the present apparatus is capable of identifying the individual actually in the driver's seat listening to that radio station, and of measuring the idle time during which the car radio could have been turned ON but actually was not. Also, the present apparatus has a rechargeable battery dedicated thereto, thereby to avoid overloading the vehicle-mounted storage battery used also for engine starter. Moreover, the present apparatus comprises a device for generating an excessive discharge alarm signal when the excessively discharged state of the rechargeable battery is detected. Furthermore, the present apparatus employs the radio station identification based on the detection of local oscillation frequency picked up at the tuner portion, which is in one to one correspondence with a radio station broadcast frequency.

10 Claims, 16 Drawing Sheets

FIG. 8
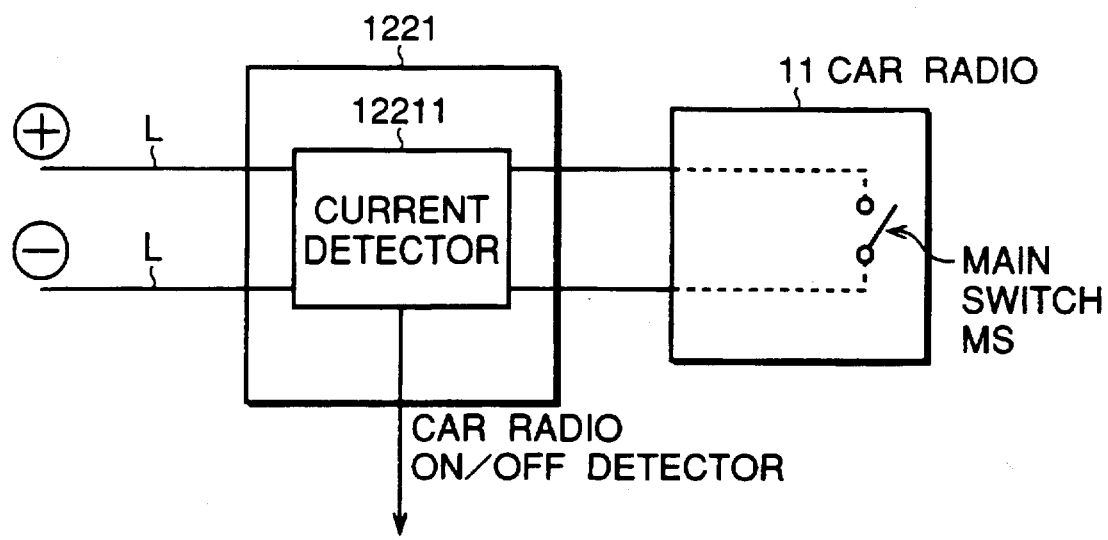
FIG. 13
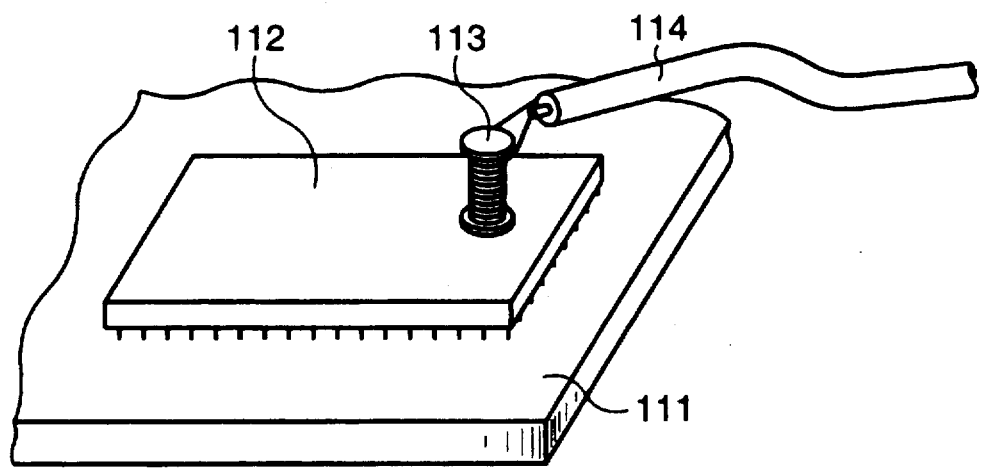
FIG. 14
| SCAN | AM/FM | FREQUENCY | STATION ID. CODE |
|------|-------|-----------|------------------|
|      |       |           |                  |

FIG. 9A

| STATUS | TIME DATA | | | | | INDIVIDUAL ID. NO. | GUEST ID. NO. | GUEST ATTRIBUTES | RADIO STATION CODE | VEHICLE CATEGORY | OPTIONAL |
|---|---|---|---|---|---|---|---|---|---|---|---|
| | MONTH | DAY | DAY OF WEEK | HR. | MIN. SEC. | | | | | | |

FIG. 9B

| | STATUS |
|---|---|
| 1 | IGNITION SW. ON |
| 2 | IGNITION SW. OFF |
| 3 | CAR RADIO ON |
| 4 | CAR RADIO OFF |
| 5 | START OF LISTENING TO RADIO STATION |
| 6 | RAD. STN. SELECTION FAIL. |
| 7 | INDIV. GET-ON |
| 8 | INDIV. GET-OFF |
| 9 | GUEST GET-ON |
| 10 | GUEST GET-OFF |
| 11 | START DATA |
| 12 | STOP DATA |
| 13 | INDIV. OBLIG. DATA |
| 14 | GUEST OBLIG. DATA |
| 15 | MEM. OVERFLOW |
| 16 | EXCESS. DISCH. ALARM |

FIG. 9C

| | DAY OF WK. |
|---|---|
| 1 | MON. |
| 2 | TUE. |
| 3 | WED. |
| 4 | THU. |
| 5 | FRI. |
| 6 | SAT. |
| 7 | SUN. |

FIG. 9D

| | INDIV. NO. |
|---|---|
| 1 | |
| 2 | |
| 3 | |
| 4 | |

FIG. 9E

| | GUEST ATTRIB. |
|---|---|
| 1 | M. 3~10 YRS. OLD |
| 2 | M. 11~15 |
| 3 | M. 16~20 |
| 4 | M. 21~30 |
| 5 | M. 31~40 |
| 6 | M. 41~50 |
| 7 | M. ABOVE 51 |
| 8 | F. 3~10 YRS. OLD |
| 9 | F. 11~15 |
| 10 | F. 16~20 |
| 11 | F. 21~30 |
| 12 | F. 31~40 |
| 13 | F. 41~50 |
| 14 | F. ABOVE 51 |

FIG. 9F

| | VEHICLE CATEGORY |
|---|---|
| 1 | FOR FAMILY USE |
| 2 | FOR BUSINESS USE |
| 3 | TRUCK |
| 4 | TAXI |
| 5 | FOR HIRE |

FIG. 15

| | | |
|---|---|---|
| 00 RADIO OFF | 21 NHK FM | 41 RADIO TAMPA 1ST |
| 01 NHK 1ST | 22 TOKYO FM | 42 RADIO TAMPA 2ND |
| 02 NHK 2ND | 23 J-WAVE | 88 OTHER AM STNS. |
| 03 FAREAST NETWORK | 24 InterFM | 99 OTHER FM STNS. |
| 04 TBS RADIO | 25 bay fm | |
| 05 BUNKA HOSO | 26 FM YOKOHAMA | |
| 06 NIPPON HOSO | 27 NACK5 | |
| 07 RADIO JAPAN | 28 FM FUJI | |
| 08 HIGHWAY RADIO | 29 RADIO BERRY | |
| 09 TOCHIGI HOSO | 30 FM GUNMA | |
| 10 IBARAKI HOSO | 31 HOSO DAIGAKU | |

FIG. 20

| START DATA |
| --- |
| INDIVIDUAL OBLIGATORY DATA |
| GUEST OBLIGATORY DATA |
| ⋮ |
| IGNITION SWITCH ON DATA |
| INDIVIDUAL GET-ON DATA |
| GUEST GET-ON DATA |
| CAR RADIO TURNED ON DATA |
| START OF LISTENING TO A FIRST RADIO STN. |
| START OF LISTENING TO A SECOND RADIO STN. |
| GUEST GET-OFF DATA |
| START OF LISTENING TO A THIRD RADIO STN. |
| CAR RADIO TURNED OFF DATA |
| IGNITION SWITCH OFF DATA |
| ⋮ |
| STOP DATA |

STATUS MONITORING APPARATUS FOR CAR RADIO

BACKGROUND OF THE INVENTION

1. Field of the Invention

The present invention relates generally to surveying a radio audience to determine the audience rating indicative of the extent to which the audience is tuned at any given time to a particular radio station and, more particularly to an apparatus for monitoring the status of use of a car radio receiver mounted on an automobile for family or business use.

2. Description of the Related Art

In recent years, radio audience survey, which has been conducted on the basis of radio sets installed at sample households, is required to also cover car radios mounted on various types of automobiles. This is because the number of people listening to radio programs over car radios has rapidly increased as a result of ever-expanding motorization.

A conventional apparatus for identifying a radio station to which a car radio is tuned employs, as disclosed in the Japanese Patent Application Kokai Publication No. 7-327017, a monitoring unit having a reference radio receiver capable of being tuned to any radio stations to which the car radio is tunable. The loudspeaker output of the car radio is picked up by a microphone and supplied to the monitoring unit, where the microphone output, i.e., a reception audio signal, is compared with a reference audio signal supplied from the reference radio receiver. If the comparison result shows the coincidence between the two, the radio station is identified by the station name stored in advance in the monitoring unit. If not, the reference receiver is tuned to the next radio station, to which the car radio is possibly tuned. The procedure is repeated until the coincidence is achieved, thereby to identify the radio station to which the car radio is actually tuned. Data relating to the identified radio station and its associated time are sent periodically through a radio link to survey center.

While such a conventional apparatus can generate data on a certain sample car radio tuned to a particular radio station at a particular time, it cannot provide data on individuals, who were actually in the driver's seat listening to the programs of interest. More specifically, the conventional apparatus based on the vehicle-by-vehicle data collection is not adapted to provide data on individual members of a family, for example, who have equal access to the automobile carrying the sample car radio. This presents some problems because the audience rating survey often requires certain criteria such as age, income, sex and level of education, in order to generate more specific data for determining advertising rates and for adjusting programming.

Similarly, the conventional apparatus is not capable of measuring the length of idle time, in which the car radio could have been tuned to any one of the radio stations but was actually kept in OFF state. Data relating to such idle time, which reflects the potential demand for new programs, can be very important for broadcasters' program planning.

Furthermore, since the conventional monitoring apparatus relies for its power supply on the vehicle-mounted storage battery used also for engine starter, continued power-ON state of the monitoring apparatus can cause the discharge of the battery beyond the allowable limit, making it impossible to start the engine of the vehicle. Also, the lowered output voltage of the storage battery can cause the monitoring apparatus to cease the transmission of collected data to the survey center. Under such situation, the survey center cannot take any effective countermeasure, due to the lack of timely information from the monitoring apparatus.

Moreover, the use of microphone to provide the reception audio signal in the conventional monitoring apparatus tends to adversely affect the reliability of the radio station identifying function, because various background sounds and noises, the difference in antenna gain between the car radio and the reference receiver, unbalanced stereophonic audio outputs from loudspeakers, the unavoidable instantaneous reception interruption, and the like can make the proper comparison of the reception audio signal with the reference receiver output impossible.

SUMMARY OF THE INVENTION

It is, therefore, an object of the invention to provide an automobile-mounted apparatus for monitoring the status of use of a car radio, which is capable of collecting use-related data on the basis of the person actually in the driver's seat and/or passengers in the automobile, and data on idle time in which the driver or the passengers could have turned ON the car radio but actually did not do so.

Another object of the invention is to provide a monitoring apparatus of this type capable of preventing the excessive discharge of the vehicle-mounted storage battery and reporting to the survey center the lowering of the storage battery output voltage below a lowest allowable level.

Still another object of the invention is to provide a monitoring apparatus of this type capable of identifying with high accuracy and reliability the radio station to which the car radio is tuned.

According to the present invention, there is provided an apparatus for monitoring the status of use of a car radio, said apparatus being mounted on a mobile vehicle adjacently to said car radio capable of being tuned one by one to a group of radio stations located in geographical districts including a target district to be covered by radio audience survey based on said status of use, said apparatus comprising: a first means for detecting the state in which said vehicle is occupied at least by a driver and for measuring the length of time in which said car radio could be turned ON; a second means for inputting data identifying said driver and other individuals expected to use said vehicle; a third means for detecting the ON and OFF states of said car radio, thereby measuring the length of time in which said car radio was in the ON state; a fourth means for identifying a radio station to which said car radio is tuned; a fifth means for storing measurement data including data supplied from said first, second, third and fourth means; a sixth means for periodically transmitting said measurement data to a survey center through a radio link; and a seventh means for supplying power to all of said first, second, third, fourth, fifth and sixth means separately from a storage battery mounted on said vehicle for energizing engine starter thereof.

According to one feature of the invention, the use-status monitoring apparatus is adapted to detect the time when a person gets in the driver's seat, and the time when the car radio is turned ON, thereby to store data on such times in a data storage. Similarly, the monitoring apparatus of this invention is adapted to generate and store individual-identifying data in response to simple depression of push-button switches by the person in driver's seat. Moreover, the monitoring apparatus of this invention is adapted to accurately identify the radio station to which the car radio is tuned, and to store the data on station name and the associated time. Similarly, the turning OFF of the car radio and driver's getting-off the car are detected and the times of these events are stored. In this way, the data relating at least to the individual in the driver's seat and/or in the automobile, idle time, identified radio station are collected, stored and sent through the radio link to the survey center.

BRIEF DESCRIPTION OF THE DRAWINGS

The above and other objects, features and advantages of the present invention will be apparent from the following description of preferred embodiments of the invention taken with reference to the accompanying drawings, in which:

FIG. 8 schematically shows a circuit diagram of an example of car radio ON/OFF state detector;

FIGS. 9A to 9F schematically show an example of format for data collected in the embodiment;

FIG. 13 shows a perspective view of a local oscillation pickup coil placed adjacently to the local oscillator of AM tuner of the car radio for detecting the local oscillation frequency;

FIG. 14 schematically shows an example of a format of radio station data stored in an EEPROM shown in FIG. 6;

FIG. 15 shows an example of a table of radio station identifying codes;

FIG. 16 shows a flow chart of an example of data processing performed at CPU of the system control unit for the search of radio station which is being listened to;

FIG. 20 shows an example of memory area allocation in an RAM for collected data;

Referring now to FIG. 1 schematically showing a radio broadcast audience monitoring system, reference numeral 1 denotes use status monitoring apparatus of the present invention mounted on respective automobiles; 2, a survey center; and 3, a base station for a radio multiple channel access (MCA) link. Monitoring apparatus 1 is arranged to collect and store data relating to the status of use of the car radio mounted adjacently thereto on the same automobile, and to transmit the stored data to survey center 2 through base station 3. Survey center 2 has an antenna 21, MCA radio transceiver 22 for receiving data from monitoring apparatus 1 through antenna 21, data-collecting computer 23 for collecting the received data, and data-accumulating computer 24 for processing the collected data into various statistics of audience analysis to provide a survey report 25. The report 25 may be related to audience rating for each radio programming and so forth, prepared on a daily, weekly or monthly basis. It will be noted here that the description of transmission of instruction data etc. from survey center 2 will be omitted because such function is not directly related to the subject matter of this invention.

Referring to FIG. 2 showing in blocks an example of monitoring apparatus 1 as coupled to car radio 11 to be monitored, monitoring apparatus 1 has a system control unit 12, individual data entry unit 13 and radio transceiver unit 14, both connected to system control unit 12, and a power supply unit 15 common to all these units 12, 13 and 14.

Figure 1:
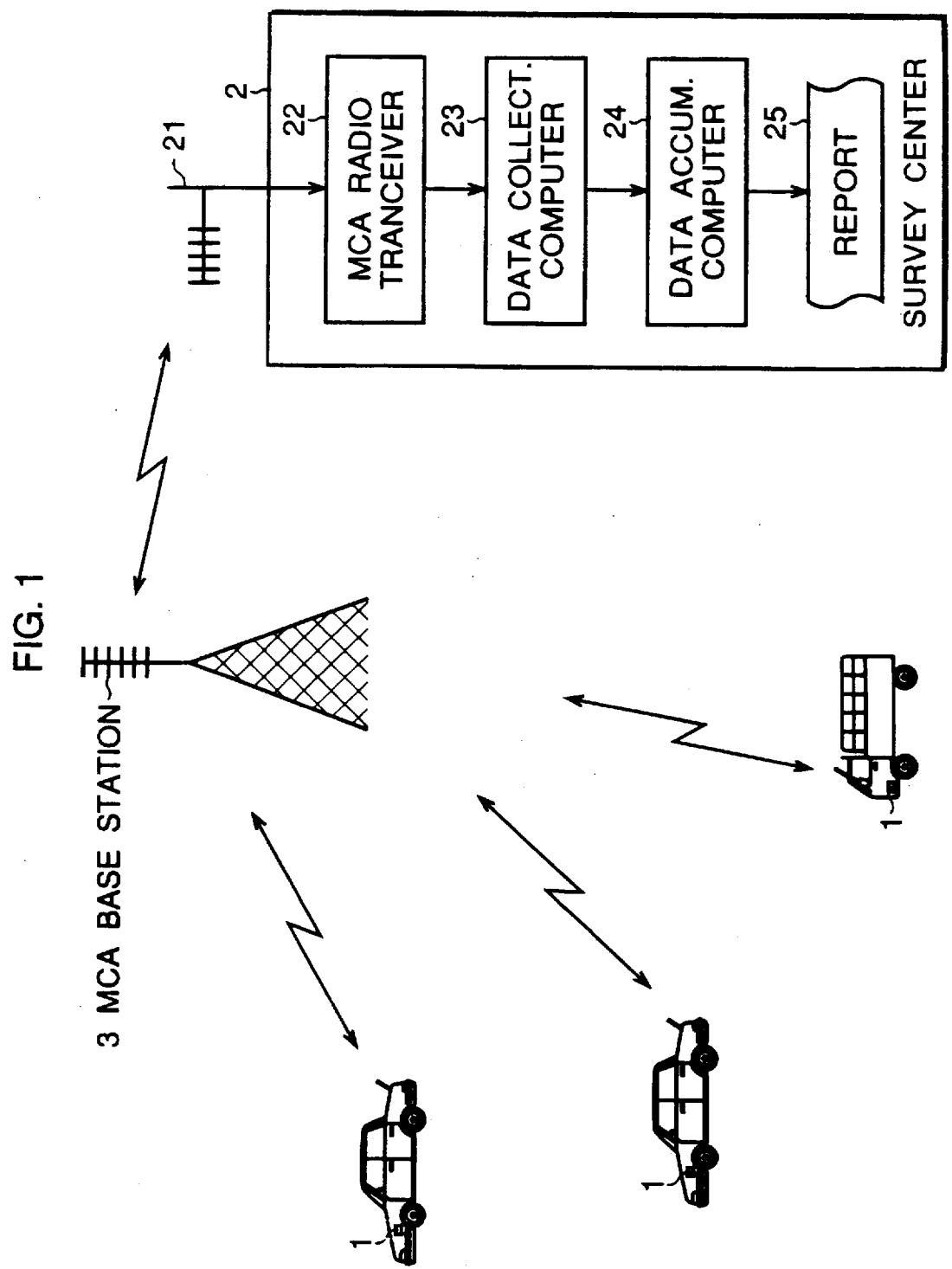
FIG. 1 schematically shows, partly in blocks, a radio broadcast audience monitoring system to which the use-status monitoring apparatus of the present invention is applicable.
Figure 2:
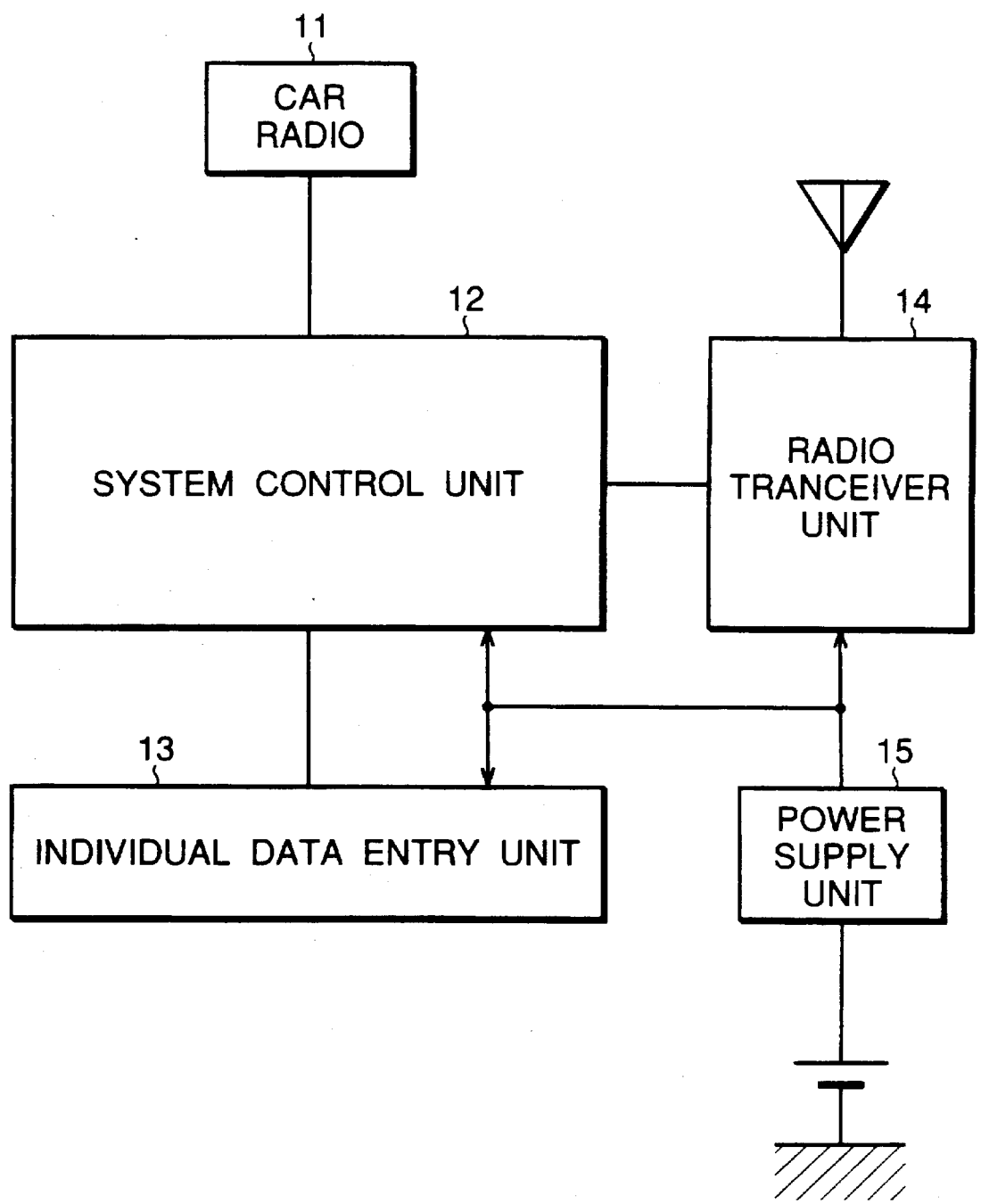
FIG. 2 schematically shows in blocks an embodiment of this invention.
Figure 3:
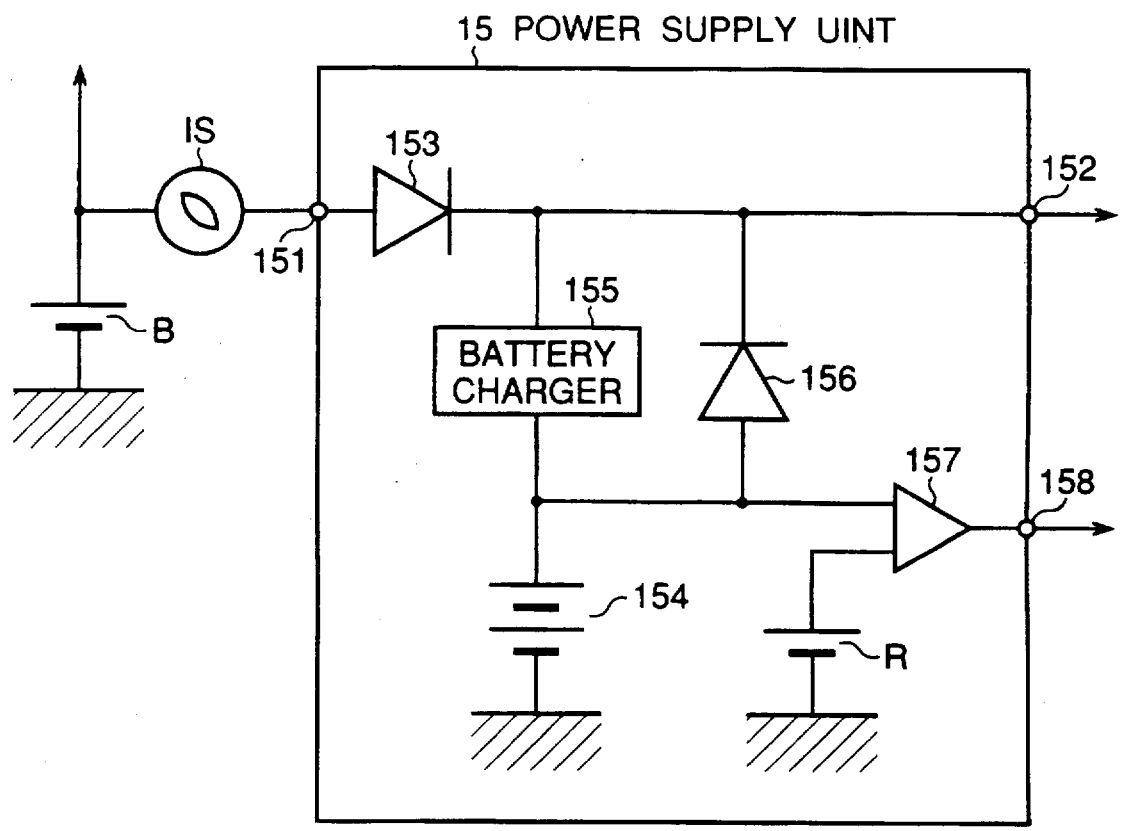
FIG. 3 shows a schematic circuit diagram of a power supply unit for the embodiment.

Power supply unit 15 has, as shown in FIG. 3 in blocks, input terminal 151 connected through ignition switch IS to vehicle-mounted storage battery B, output terminal 152 for providing power supply voltage for the above-mentioned units, diode 153 inserted between input terminal 151 and output terminal 152, rechargeable battery 154, battery charger 155 connected to rechargeable battery 154 and the cathode terminal of diode 153, another diode 156 coupled in parallel with battery charger 155, voltage comparator 157 adapted to compare the voltage of rechargeable battery 154 with a certain reference voltage from voltage source R to provide an excessive discharge alarm signal, and an alarm signal output terminal 158 for outputting the excessive discharge alarm signal to system control unit 12 (FIG. 2).

Referring further to FIG. 3, vehicle-mounted storage battery B is always being charged by a generator (not shown) while the vehicle is travelling with ignition switch IS on. Under that state, power is supplied from storage battery B to output terminal 152 through input terminal 151 and diode 153, so that the above-mentioned units 12, 13 and 14 (FIG. 2) of monitoring apparatus 1 are powered by storage battery B. Also, in this state, battery charger 155 is powered by storage battery B to keep charging rechargeable battery 154. If the automobile is parked with ignition switch IS in OFF state, the above-mentioned units of monitoring apparatus 1 is powered by rechargeable battery 154 through diode 156 and output terminal 152. When the output voltage of rechargeable battery 154 is lowered below a predetermined lower limit value, comparator 157 provides the excessive discharge alarm signal through output terminal 158 to system control unit 12.

Figure 4A:
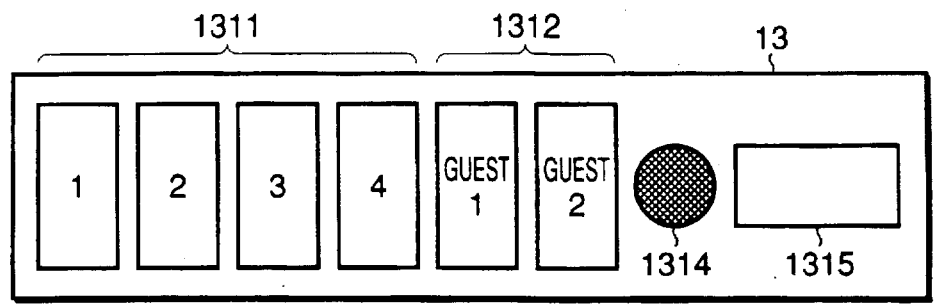
FIG. 4A schematically shows a front view of a data entry unit employed in the embodiment for registering individual-specifying data.
Figure 4B:
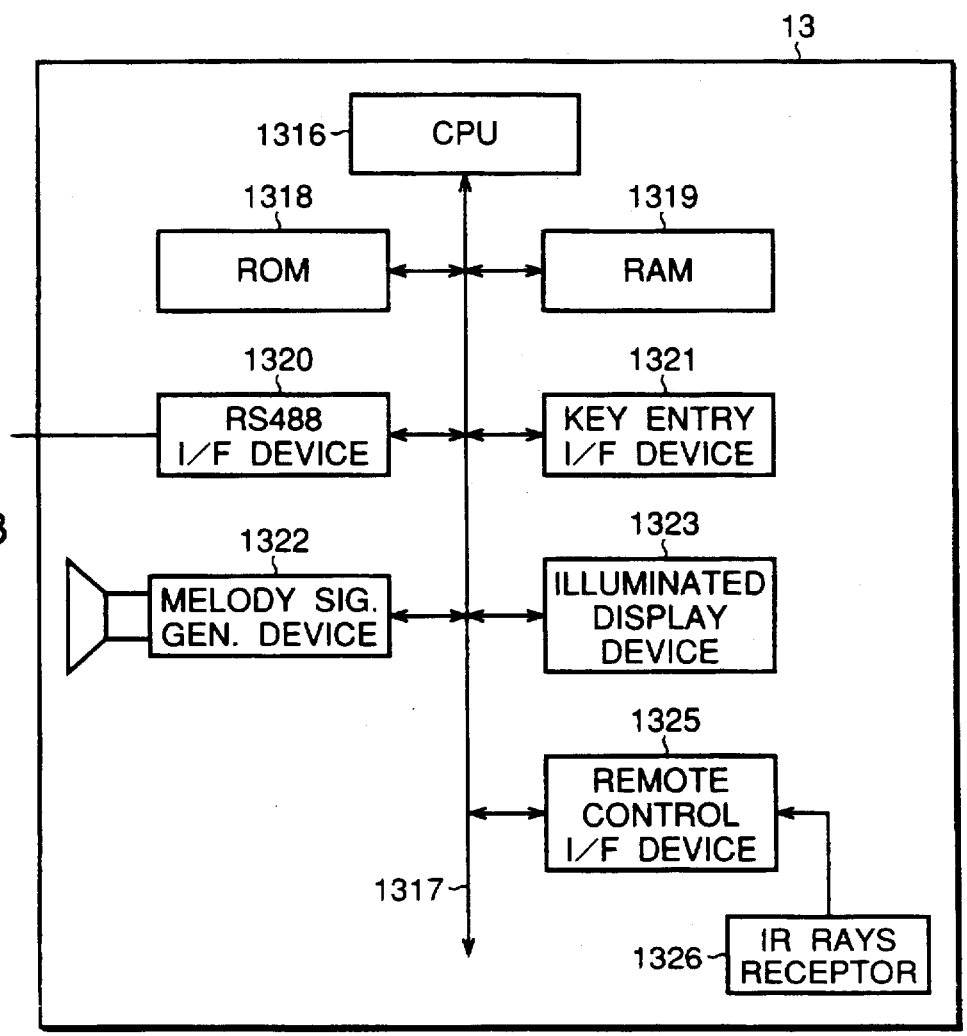
FIG. 4B shows in blocks the details of the data entry unit shown in FIG. 4A.

Individual data entry unit 13, whose front view and block diagram are shown in FIGS. 4A and 4B, respectively, is designed to be mounted on the lower part of the dashboard of an automobile. As shown in FIG. 4A, the front panel of data entry unit 13 has four illuminated individual-identifying pushbutton switches (individual buttons) 1311, two illuminated guest-indicating pushbutton switches (guest buttons) 1312, annunciator 1314, and optical receptor 1315 for receiving infrared or other optical signal from remote control unit to be described below. Individual buttons 1311 are assigned respectively to members of a family expected to use the automobile. These switches 1311 may be labelled with numbers as shown or, alternatively, may have photographs of the respective family members attached thereto. Guest buttons may be marked "Guest No.1" and "Guest No.2," for example.

Internal circuit of data entry unit 13 includes: as shown in FIG. 4B, CPU 1316 for the overall control of unit 13; and ROM 1318, RAM 1319, RS488 interface device 1320, key input interface device 1321, melody signal generating device 1322, illuminated display device 1323 and remote control interface device 1325 supplied by infrared rays receptor 1326 with remote control signals, all connected through data bus 1317 to CPU 1316. ROM 1318 stores a computer program for the control of data entry unit 13, with RAM 1319 serving as a work area and the like. RS488 interface device 1320 constitutes an interface between data entry unit 13 and system control unit 12. Key input interface device 1321 is adapted to translate the ON/OFF state of pushbutton switches 1311 and 1312 into data for CPU 1316. Melody signal generating device 1322 is for generating a melody signal to be supplied to annunciator 1314, which provides a certain melody to prompt a driver or a guest to press proper pushbutton switches 1311 or 1312 immediately after getting on the automobile. Illuminated display device 1323 is for providing the illumination for pushbutton switches 1311 and 1312. Remote control interface device 1325 adapted to receive output from infrared rays receptor 1326 is for translating the receptor output into guest attributes and other data inputted from a remote control unit to be described below.

Figure 5A:
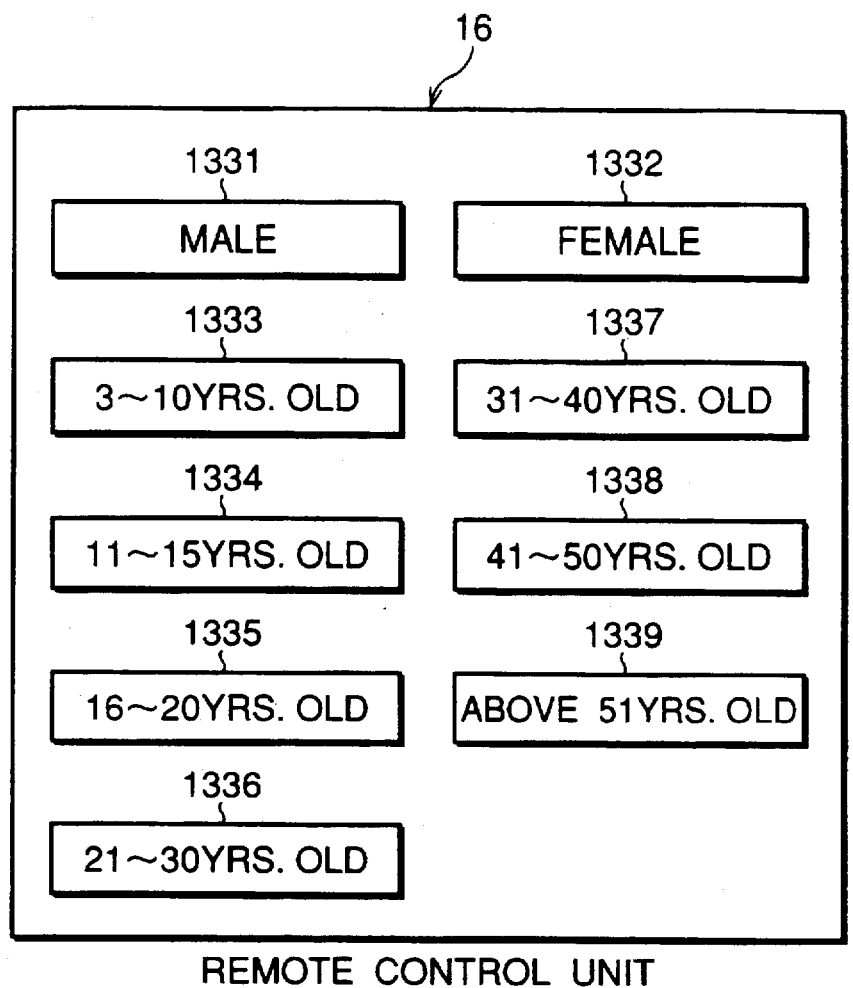
FIG. 5A schematically shows a plan view of a remote control unit for use with the data entry unit shown in FIGS. 4A and 4B.
Figure 5B:
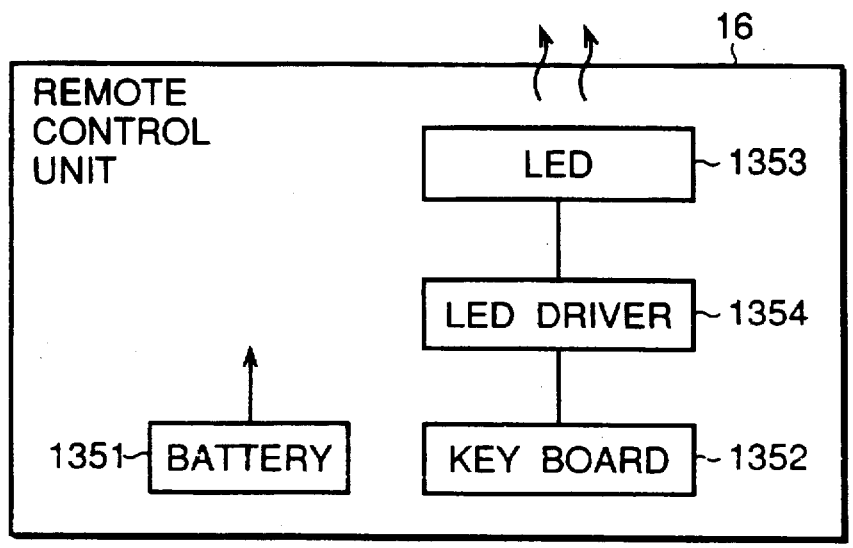
FIG. 5B shows in blocks the details of the remote control unit shown in FIG. 5A.

FIG. 5A shows a plan view of remote control unit 16 to be used in combination with individual data entry unit 13, and FIG. 5B shows in blocks the internal circuit thereof. Remote control unit 16, which is used when the passengers in the automobile include guests whose identities are not preregistered in data entry unit 13, is for inputting the attributes of such guests. As shown in FIG. 5A, remote control unit 16 has various pushbutton switches for sexes (switches 1331 and 1332) and age brackets (switches 1333–1339). The electrical circuit of remote control unit 16 includes, as shown in FIG. 5B, a battery 1351 for supplying power to various circuit elements employed in remote control unit 16, a keyboard 1352 including pushbutton switches 1331–1339, infrared rays emitting device (LED) 1353 and LED driver 1354 for driving LED 1353 in response to the data inputted by keyboard 1352.

Figure 6:
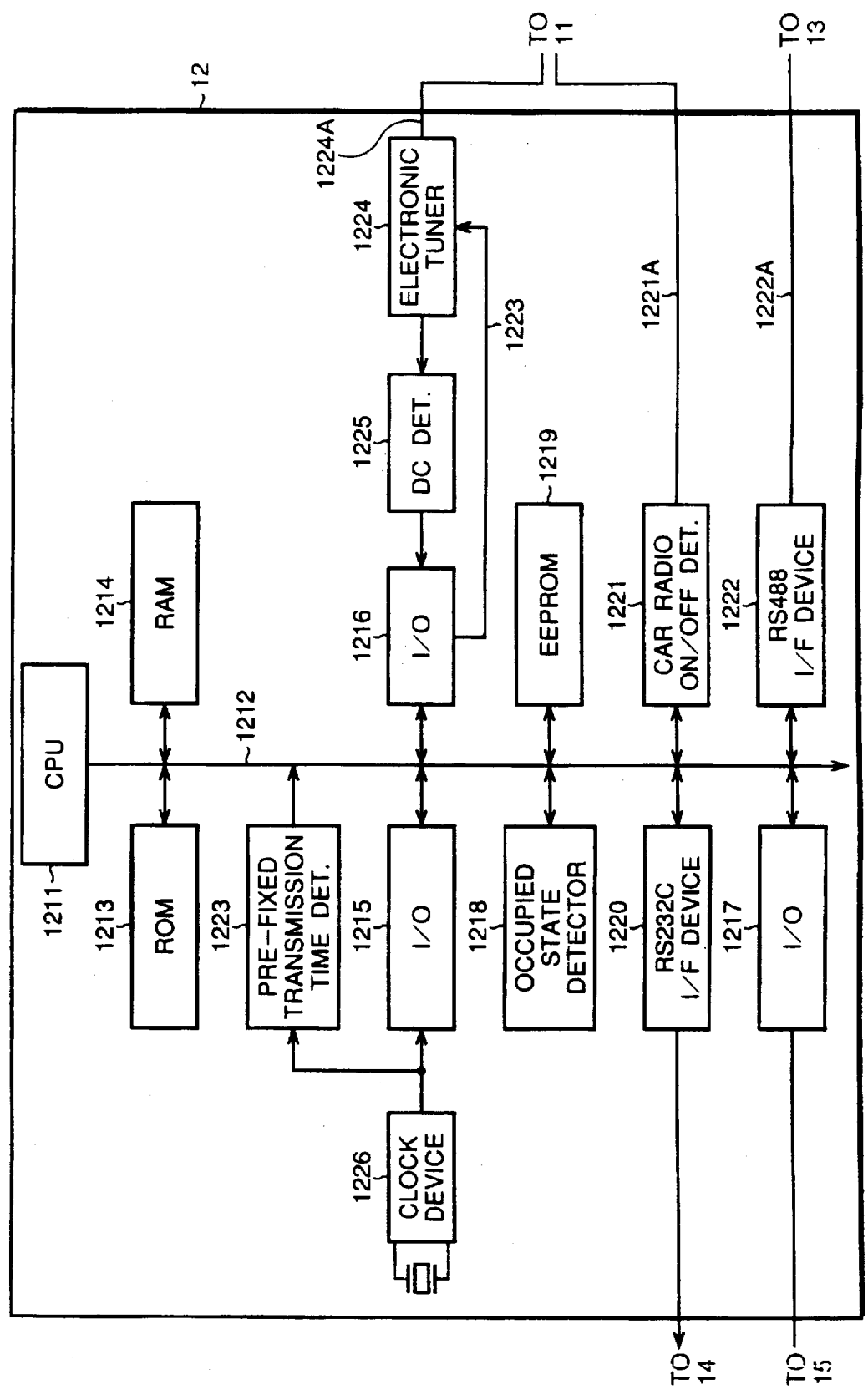
FIG. 6 shows in blocks the details of a system control unit employed in the embodiment shown in FIG. 2.

System control unit 12 shown in blocks in FIG. 6 has a CPU 1211 for the control of major part thereof. Connected to CPU 1211 through data bus 1212 are ROM 1213, RAM 1214, interface devices 1215–1217, occupied state detector 1218, EEPROM 1219, RS232C interface device 1220 coupled to radio transceiver 14, car radio ON/OFF detector 1221 coupled to car radio 11 through connection wire 1221A, RS488 interface device 1222 coupled to individual data entry unit 13 through connection wire 1222A, prefixed transmission time detector 1223 supplied by clock device 1226 with time data, electronic tuner 1224 coupled through connection wire 1224A to car radio 11 for detecting local oscillation frequency thereof, DC detector 1225 coupled through I/O device 1216 to data bus 1212 with I/O device 1216 being coupled through connection wire 1230 to electronic tuner 1224 for detecting by DC detector 1225 DC component from the demodulation of the output from electronic tuner 1224.

ROM 1213 stores programs to be executed by CPU 1211. RAM 1214 is for providing the work area and for storing the collected data. Clock device 1226 is for providing current time data, which is also supplied to CPU 1211 through I/O interface device 1215. The time data supplied to prefixed transmission time detector 1223 causes the latter to generate interruption to notify CPU 1211 of the transmission time set in advance. RS232C interface device 1220 provides an interface with radio transceiver unit 14 (FIG. 2), while RS488 interface device 1222 forms an interface with individual data entry device 13, and I/O interface device 1217 forms an interface with power supply unit 15 to receive the excessive discharge alarm signal.

Figure 7:
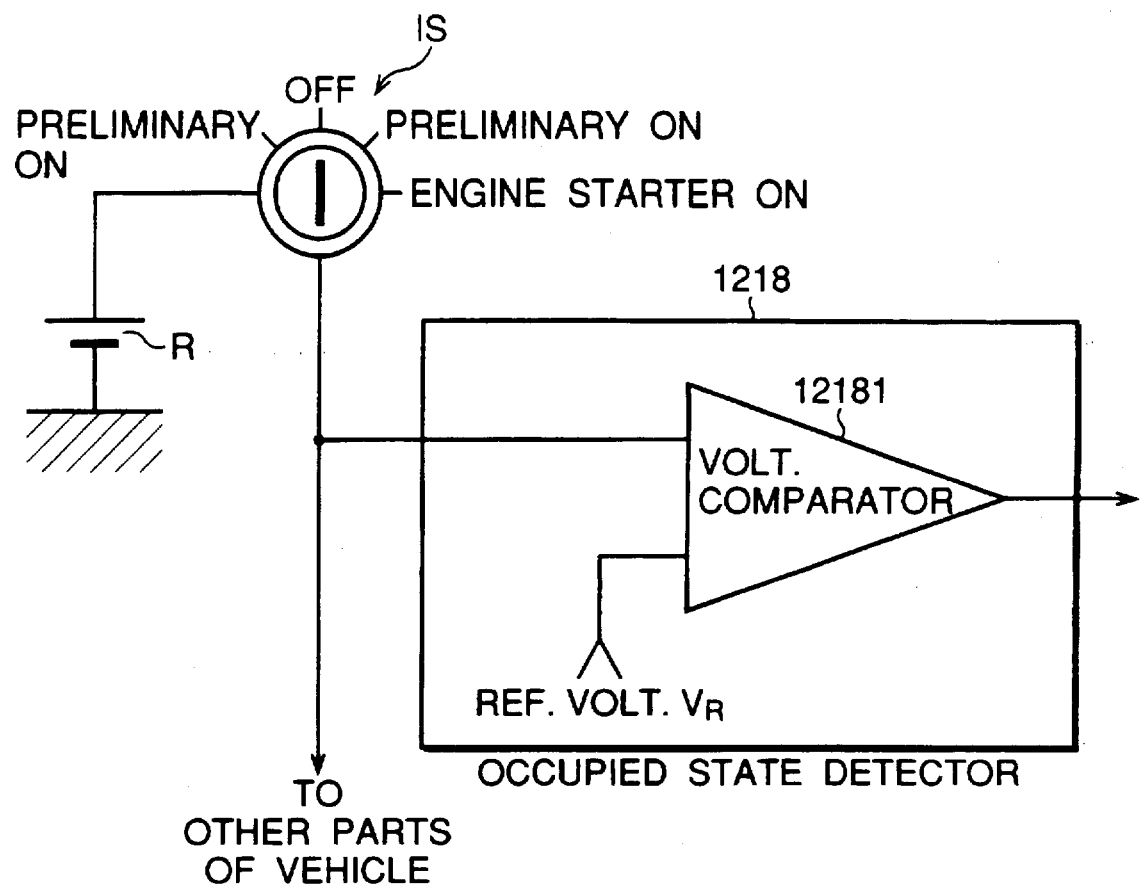
FIG. 7 schematically shows a circuit diagram of an example of occupied state detector.

In the block diagram of FIG. 6, occupied state detector 1218 detects whether a person is in the driver's seat or not. An example of the details of detector 1218 is shown in FIG. 7. As will be seen in the drawing, detector 1218 has a voltage comparator 12181 having a first input terminal connected to a reference voltage source $V_R$ and a second input terminal connected to vehicle-mounted storage battery B through ignition switch IS. Ignition switch IS has four click-stop positions, i.e., OFF, reverse preliminary ON, forward preliminary ON, and engine starter ON positions. As well known, both reverse and forward preliminary ON positions of ignition switch IS provide the output power from storage battery B to various vehicle-mounted equipment including occupied state detector 1218. Voltage comparator 12181 is therefore arranged to compare with the reference voltage $V_R$ the supply of the voltage through the ON positions of switch IS, thereby to detect the ON state of switch IS, which reflects the occupied/unoccupied states of the automobile. Although switch IS can remain in OFF state with one or two people staying in the automobile, such state is believed to occur very rarely.

Alternatively, occupied state detector 1218 can consist of an LED and a receptor therefor arranged to detect the getting on and off of a person or persons.

Referring to FIG. 8, car radio ON/OFF detector 1221 consists of a current detector 12211 inserted between power supply line L (connected to vehicle-mounted storage battery B) and car radio 11. Upon turning ON of main switch MS of car radio 11, the flow of current through line L is detected by current detector 12211 to thereby provide a detection output for the ON state of car radio 11.

Other structural elements of system control unit 12 shown in FIG. 6 including electronic tuner 1224, DC detector 1225, I/O interface device 1216 and EEPROM 1219, which are all for identifying a radio station to which car radio 11 is actually tuned, will be described below in conjunction with the station identifying computer program to be executed by CPU 1211.

Referring to FIG. 9A showing an example of a format of collected and stored data, those data including ON/OFF states of ignition switch IS, ON/OFF states of car radio 11, identification of radio station to which car radio 11 is tuned, and getting OFF/ON of person/persons, are generated at CPU 1211 (FIG. 6) in response to each of these events, and stored in measurement data storage area in RAM 1214. Details of such data shown in FIGS. 9B–9F are as follows:

(a) STATUS: Area marked "STATUS" is assigned to a number selected out of sixteen (16) kinds of states as shown in FIG. 9B;

(b) TIME DATA: Area "TIME DATA" is assigned to indication of time at which the event entered in "STATUS" occurred. Time data is supplied from clock device 1226. Such time data includes the indication for a day of the week, in addition to that for month, day, hour, minute and second. Days of the week are denoted by numbers as shown in FIG. 9C;

(c) INDIVIDUAL IDENTIFICATION NUMBER: This area is assigned to an identification number inputted by the depression of individual buttons 1311 at individual data entry unit 13. Individuals are identified by numbers as shown in FIG. 9D;

(d) GUEST IDENTIFICATION NUMBER: This area is assigned to a guest identification number inputted by guest buttons 1312 of individual data entry unit 13. Data on upto two guests can be entered, by assigning number 1 or 2 to the guests;

(e) GUEST ATTRIBUTES: This area is for guest attributes inputted by pushbutton switches 1331–1339 of remote control unit 16. Details of guest attributes are, as shown in FIG. 9E, denoted by numbers 1–14;

(f) RADIO STATION CODE: This area is assigned to a code denoting the identification number of a radio station to which car radio 11 has been newly tuned;

(g) VEHICLE CATEGORY: This area is assigned to a number signifying the category of the vehicle on which car radio 11 and monitoring apparatus 1 are mounted. As shown in FIG. 9F, automobiles are classified into five categories. The number is inputted at the time the automobile has been selected as a sample for radio audience survey;

(h) OPTION: This area is reserved for additional data collection in the future.

The operation of use status monitoring apparatus 1 will now be described in conjunction with events taking place in the automobile.

Figure 10:
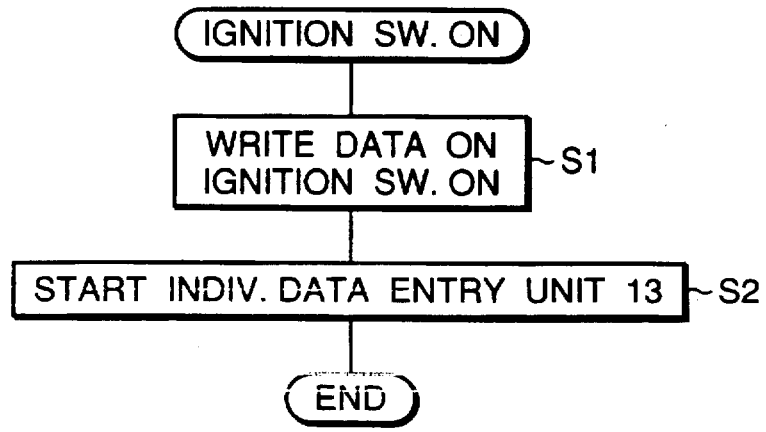
FIG. 10 shows a flow chart of typical data processing performed at CPU of the system control unit at the time of turning ON of the ignition switch of the automobile.

(1) Turning ON of ignition switch IS:

The turning ON of ignition switch IS after the driver's getting on is detected by occupied state detector 1218 (of system control unit 12), which supplies the detection output to CPU 1211. Upon receipt of the detection output, CPU 1211 causes, as shown in FIG. 10, the data representative of ON state of switch IS (IS ON data) to be stored at measurement data storage location of RAM 1214 (step S1). In the data format shown in FIG. 9A, the IS ON data is given code number 1 in STATUS, with the current time in TIME DATA, and an appropriate code number in VEHICLE CATEGORY. CPU 1211 then gives through RS488 interface device 1222 an instruction to individual data entry unit 13 to start its operation (step S2).

In response to this instruction received through RS488 interface device 1320 (FIG. 4B), CPU 1316 of individual data entry unit 13 starts melody signal generating device 1322 and simultaneously causes illuminated display device 1323 to start blinking. Thus, a certain melody from annunciator 1314 and the blinking at pushbutton switches 1311 and 1312 prompt the driver and/or his guest(s) to enter proper data associated with them.

(2) Depression of individual-identifying pushbutton switches:

The depression of one of pushbutton switches 1311 on the front panel of individual data entry unit 13 by the driver is converted into the individual-identifying data for transfer to CPU 1316. The individual-identification data representative of the number given to the depressed pushbutton switch is sent by CPU 1316 to system control unit 12 through RS488 interface device 1320. Also, CPU 1316 stops the melody signal generation at signal generating device 1322 and instructs display device 1323 to stop blinking and limit the illumination only to the depressed one of pushbutton switches 1311.

Figure 11:
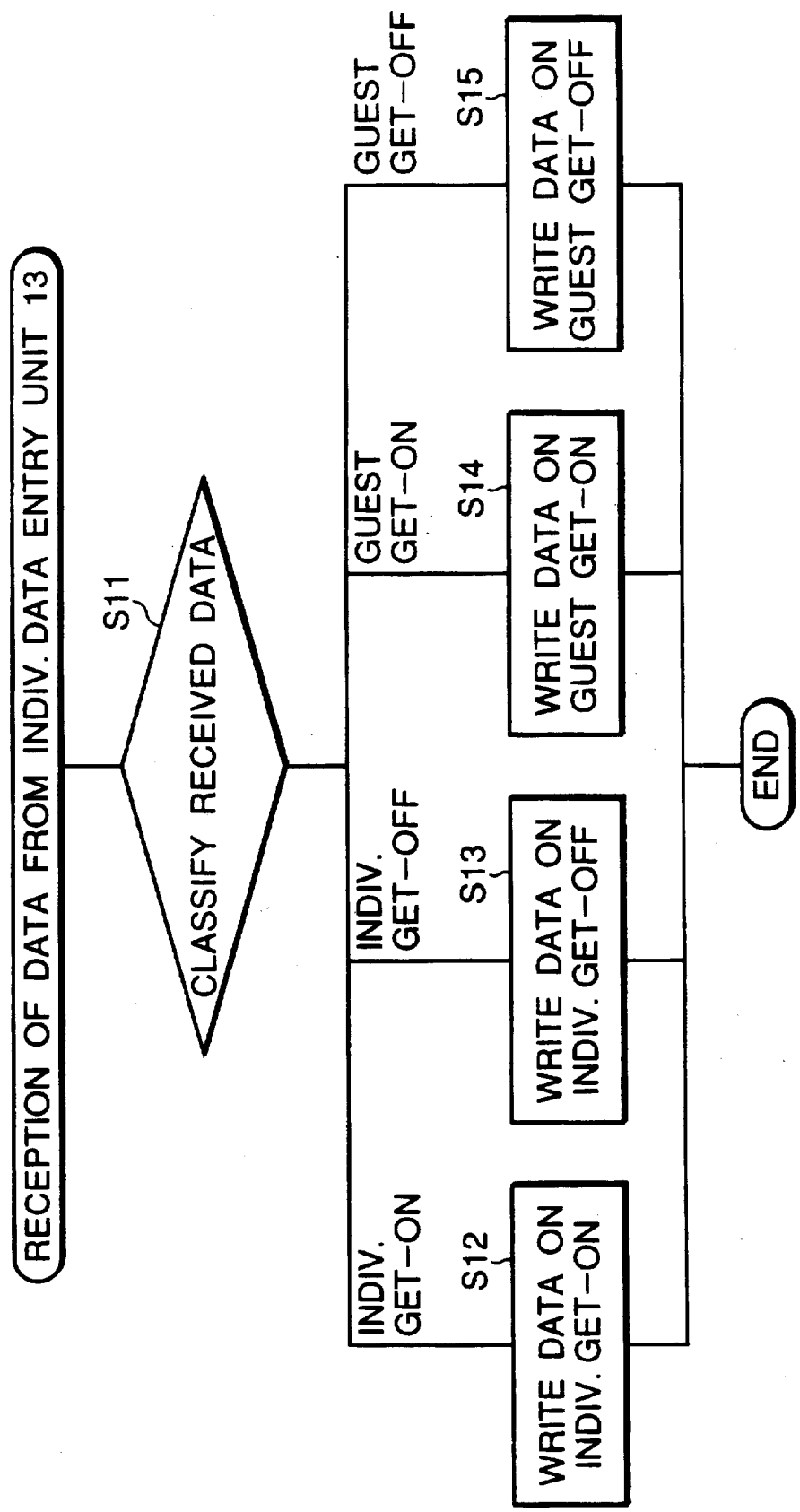
FIG. 11 shows a flow chart of data processing performed at CPU of the system control unit at the time of reception of data from the data entry unit.

The individual-identifying data supplied to CPU 1211 of system control unit 12 through RS488 interface devices 1320 and 1222 causes CPU 1211 to start the processing shown in FIG. 11. As shown in the flow chart, the received data is first decided to be representing the ON state of individual-identifying pushbutton switches 1311 (step S11), and then another data indicating the getting-on of that individual is produced, to permit the measurement data to be written in measurement data storage location of RAM 1214 (step S12). With respect to this data on individual's getting-on, the format shown in FIG. 9A has "7" in STATUS, the current time in TIME DATA, the pushbutton number of data entry unit 13 in INDIVIDUAL IDENTIFICATION NUMBER.

Data with respect to another pre-registered passenger, if any, is entered by the depression of another one of pushbutton switches 1311, with other data associated with him similarly stored in measurement data storage location in RAM 1214.

(3) Turning ON of guest pushbutton switches:

If another passenger is a guest whose identity is not pre-registered in data entry unit 13, guest button 1312 assigned to Guest No.1 is depressed, which causes the depressed switch to be kept illuminated by illuminated display device 1323, and then the attributes of that guest are inputted by remote control unit 16. More specifically, if he is a male of late thirties, switches 1331 (for male) and 1337 (for the age bracket of 31–40) are depressed. The data inputted by the pushbutton switches in this way are sent, under control by remote control unit 16, to individual data entry unit 13 by means of infrared (IR) rays generated at LED 1353. The IR rays are received and converted into data signal by IR rays receptor 1326 for demodulation at remote control I/F device 1325. In response to the data received at remote control I/F device 1325, CPU 1316 assigns a work area in RAM 1319 correspondingly to the depressed guest button No.1, and simultaneously send the same data to system control unit 12 through RS488 interface device 1320. As shown in FIG. 11, CPU 1211 of system control unit 12 decides that the received data is a guest-associated data (step S11), and produces as a measurement data the guest-associated data and stores the same data at measurement data storage location in RAM 1214 (step S14). With respect to this guest-associated data, the format shown in FIG. 9A has "9" in STATUS, current time in TIME DATA, "1" in GUEST NUMBER, the depressed pushbutton switch number at data entry unit 13 in GUEST ATTRIBUTES (e.g., number "5" for a male of late thirties).

If there are two guests, the other one of the guest buttons 1312 marked "Guest No.2" is also depressed, and his attributes are similarly inputted by remote control unit 16 to cause similar data to be produced and stored.

(4) Turning OFF of individual-identifying pushbutton switches:

The driver turns OFF the individual-identifying switch 1311 at the time of getting off the automobile. That operation is translated into data at key entry interface 1321, which is sent to CPU 1316. In response, CPU 1316 sends the number identifying the turned-OFF switch 1311 to system control unit 12 through RS488 interface device 1320. At the same time, CPU 1316 causes illuminated display device 1323 corresponding to the turned-OFF switch to be turned OFF. CPU 1211 of system control unit 12 starts, in response to the data from the individual data entry unit 13 received through RS488 interface devices 1320 and 1222, the processing as shown in FIG. 11, in which the received data is decided to represent the turning OFF of individual-identifying switch 1311 (step S11), data associated with getting-off is generated and stored in measurement data storage location of RAM 1214 (step S13). With respect to this getting-off associated data, the format shown in FIG. 9A has: "8" in STATUS, current time in TIME DATA; pushbutton switch number of data entry unit 13 in INDIVIDUAL IDENTIFICATION NUMBER. The above-described operation applies to the situation where other passenger or passengers get off the automobile, generating similar getting-off associated data and storing the same data. The same operation applies to another situation where the driver leaves the automobile temporarily with the engine kept running, except that he needs to repeat the initial registration procedure upon returning.

(5) Turning OFF of guest pushbutton switches:

If the person getting off is a guest, the guest button 1312 (Guest No.1, for example), which was turned ON at the time of getting on, is turned OFF. In response to the turn-OFF data supplied from key entry interface device 1321 following the turning OFF of switch 1312, CPU 1316 of data entry unit 13 reads from RAM 1319 the guest attributes data, which was written in response to the depression of switch 1312 at the time of getting on, and transfers the read-out data through RS488 interface device 1320 to system control unit 12. Based on this data supplied through RS488 interface devices 1320 and 1222, CPU 1211 of system control unit 12 produces "guest getting off"—associated data for storage in RAM 1214 (steps S11 and S15 of FIG. 11). This data has, in the format shown in FIG. 9A, "10" in STATUS, current time in TIME DATA, "1" in GUEST IDENTIFICATION NUMBER and guest attributes data from data entry unit 13 in GUEST ATTRIBUTES.

Figure 12:
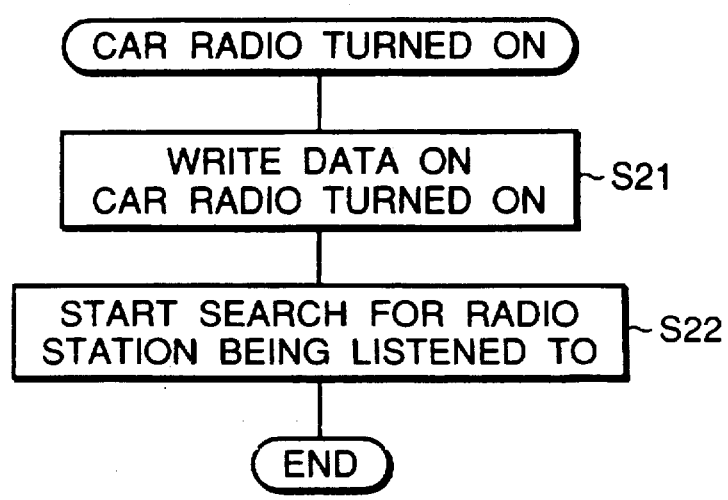
FIG. 12 shows a flow chart of data processing performed at CPU of the system control unit at the time of turning ON of the car radio.

(6) Turning ON of the car radio:

Turning ON of main switch MS of car radio 11 by the driver or another person in the automobile is detected by car radio ON/OFF detector 1221 (FIG. 6) and the detection output is transferred to CPU 1211. In response, CPU 1211 starts the processing shown in FIG. 12 and produces the car radio ON data for storage in measurement data storage location of RAM 1214 (step S21). This data has, in the format shown in FIG. 9A, "3" in STATUS, and current time in TIME DATA. CPU 1211 then initiates the search for radio station being listened to (step S22).

(7) Station selection at the car radio:

The radio station to which car radio 11 is tuned is identified as follows:

It is assumed here that car radio 11 is an AM-FM radio receiver capable of superheterodyne reception of an AM standard broadcast in the 531–1602 kHz band, an AM traffic information broadcast at 1620 kHz, and an FM broadcast in the 76–89 MHz band. Since a radio receiver based on superheterodyne reception generates a local oscillation of a frequency in one to one correspondence to the radio frequency carrier wave to be received, the detection of local oscillation frequency leads directly to the identification of the radio station to which car radio 11 is tuned. More specifically, when an AM radio station A broadcasting at 594 kHz is received, the local oscillation is at 1044 kHz (594 kHz+450 kHz (i.f.)), with the result that the detection of local oscillation at 1044 kHz leads to the identification of radio station A. Similarly, when an FM station B broadcasting at 82.5 MHz is received, the detection of local oscillation at 71.8 MHz (82.5 MHz−10.7 MHz (i.f.)) leads to identification of radio station B.

The local oscillation is detected by placing a pick-up coil adjacently to the local oscillator at the tuner of car radio 11. A single pick-up coil placed at a point sufficiently close to the local oscillator of AM tuner in common to both AM and FM local oscillators has proven to be sufficient because of the relatively high level leakage energy from the local oscillator of FM tuner.

Referring to FIG. 13, such pick-up coil 113 is schematically shown in a perspective view as attached to an IC device 112 constituting an AM tuner mounted onto printed circuit board 111 of AM radio 11. The local oscillation output induced at pick-up coil 113 is supplied to electronic tuner 1224 of system control unit 12 through coaxial cable 114, which is connected to wiring 1224A (FIG. 6).

Electronic tuner 1224 can consist of a tuner similar to the one employed in car radio 11, which is capable of selecting out of input radio frequency signals a frequency component designated by radio station selection control signal supplied through wiring 1230, and providing the selected frequency component at an intermediate frequency. Electronic tuner 1224 differs from the corresponding tuner for car radio 11 in that it receives the local oscillation leakage energy in contrast to the radio frequency signals supplied through antenna to car radio 11. Only when tuner 1224 is tuned to the local oscillation from puck-up coil 113 with a certain tuning control signal from wiring 1230 applied, sinusoidal wave signal is outputted from electronic tuner 1224. Thus, the detection of such sinusoidal wave output by DC component detector 1225 having a rectifier leads to the identification of the frequency to which car radio 11 is tuned. Data on the voltage level of the output of DC component detector 1225 is therefore supplied through I/O interface device 1216 to CPU 1211 for decision of tuned state, making it possible to positively identify, the radio station to which car radio 11 is tuned.

It is to be noted here that sample vehicles carrying car radios do not necessarily remain in a certain geographical district to be covered by the radio audience survey. They may travel far outside the district and listen to radio stations in those far-away districts. In some cases, they may listen to satellite (relay) stations located in the target district. While those radio stations outside the target district may be disregarded for the purpose of survey, the data on listening to such outside radio stations may also be collected, in order to make it possible to distinguish such listening from the state in which the radio station identification is impossible. However, if all the AM and FM radio stations to which car radio 11 is tunable are to be identified, it would take impractically long time to cover all the possible frequencies. To avoid this problem, the present system adopts a three-layered grouping of radio stations classified depending on priority as follows, so that radio stations of higher priority are surveyed first, followed by those of intermediate priority and then by those of low priority:

(a) Radio stations within the target district to be covered by the survey (highest priority);

(b) Satellite (relay) radio stations within the target district to be covered by the survey (intermediate priority); and (c) Radio stations outside the district of interest.

To permit the scanning of radio stations by the survey center depending on the priority, the data format for storage at EEPROM 1219 (FIG. 6) is arranged to have "SCAN" code for the radio station scanning as shown in FIG. 14. Code numbers 1, 2 and 3 are entered in the SCAN location for radio stations of highest, intermediate and lowest priorities, respectively. In the same data format shown in FIG. 14, "AM/FM" is for a code distinguishing AM radio stations from FM radio stations, "TUNING FREQUENCY" for the voltage of the station selection signal (at wiring 1230) for tuning electronic tuner 1224 to a radio station of interest and to local oscillation corresponding thereto. "STATION CODE" is for an identification code for each of the AM and FM radio stations. Such codes assigned to respective radio stations of interest in the Tokyo district are listed in FIG. 15.

Figure 16:
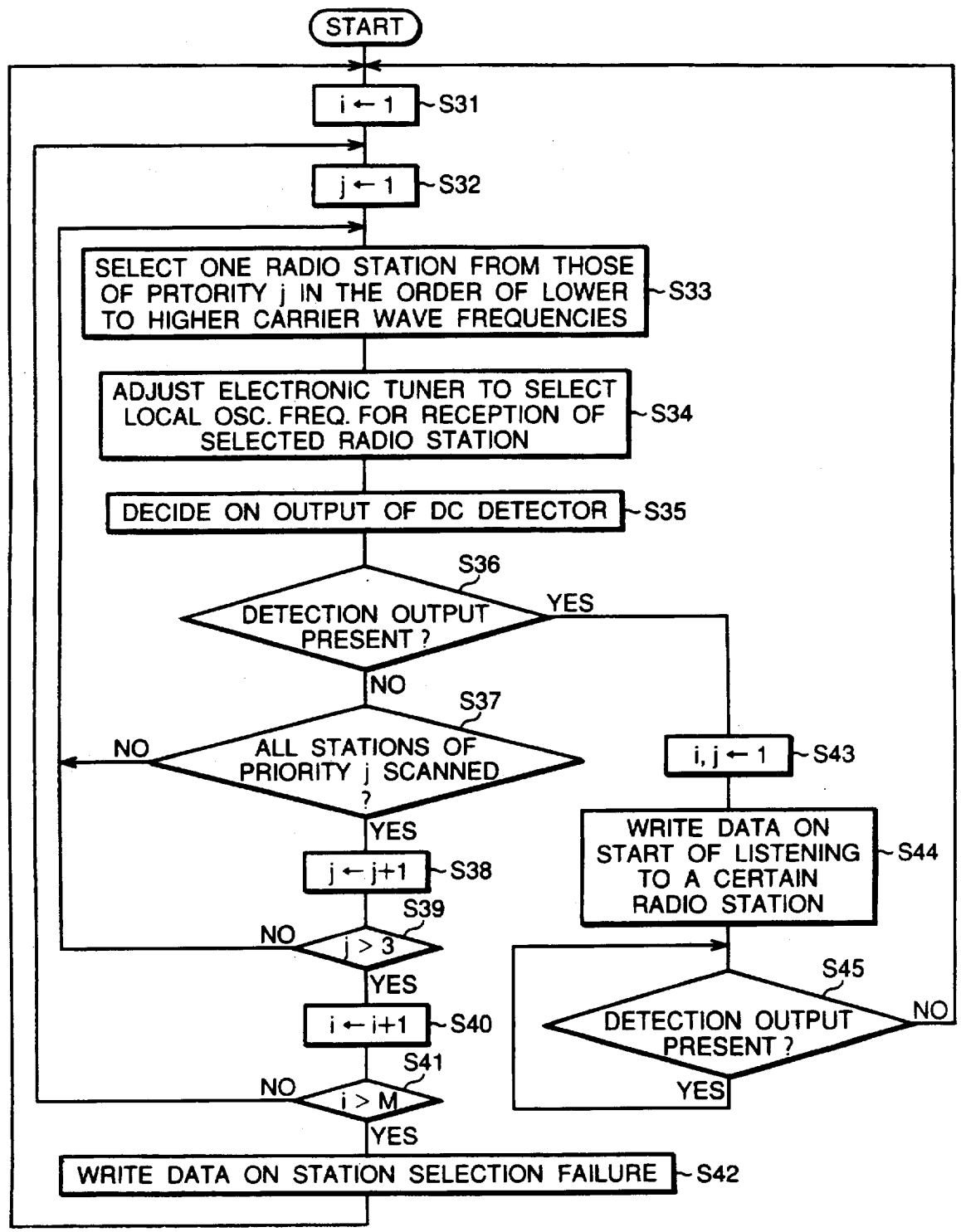

Referring to FIG. 16 showing a flow chart of data processing performed at CPU 1211, the operation of identifying a radio station to which car radio 11 is tuned proceeds, when started, to steps S31 and S32, where both variables i and j are initially set to "1." As a result, of the broadcast station identification codes stored in EEPROM 1219, those of priority j (i.e., "1" initially) are scanned:

More specifically, out of those radio stations of priority "1," that one of lowest carrier wave frequency is selected first (step S33), thereby to provide through wiring 1230 the station selection control signal of proper voltage to electronic tuner 1224 (step S34), whose output is supplied to DC detector 1225 for the decision of DC component output (step S35) and for the decision of the presence or absence of detection output (step S36). If the detection output is decided to be present, the processing proceeds to step S43. If not, the processing returns to step S33 through step S37 and the same processing is repeated with respect to a next priority "1" radio station of the second lowest carrier wave frequency.

If electronic tuner 1224 should be unable to reach a tuned state with any one of the priority "1" radio stations (YES in step S37), variable j is increased by 1 to set it to "2" (step S38), and the processing returns to step S33 through step S39, so that the same processing is repeated with respect to priority "2" radio stations. When electronic tuner 1224 reaches a tuned state with one of the priority "2" radio stations, the processing proceeds to step S43. However, if the tuned state was not achieved with any one of the priority "2" radio stations, variable j is increased by 1 to be set to "3" (step S38), and the processing returns to step S33 through step S39, thereby to repeat the same processing with respect to priority "3" radio stations. Upon reaching the tuned state by electronic tuner 1224 with one of the priority "3" radio stations, the processing proceeds to step S43. On the other hand, if the tuned state could not be reached by electronic tuner 1224, variable i is increased by 1 to be set to 2 (step S40) with variable j exceeding 3 if increased by 1 (step S38), and the processing returns to step S32 through step S41, thereby to restart the scanning with respect to priority "1" radio stations. If electronic tuner 1224 should fail to reach a tuned state even after the above-described return to the scanning of the priority "1" radio stations for M times (M is a predetermined integer) (YES in step S41), data representative of radio station selection failure is provided for storage in measurement data storage area in RAM 1214 (step S42). The processing then returns to step S31 to restart the scanning of the priority "1" radio stations. With respect to the above-mentioned data representative of radio station selection failure, the data format shown in FIG. 9A has code "6" in STATUS, and the current time in TIME DATA.

When the processing proceeds to step S43 as a result of reaching the tuned state by electronic tuner 1224 with one of the radio stations, CPU 1211 initializes variables i and j to be reset to 1. At the same time, CPU 1211 writes in measurement data storage area of RAM 1214 the data representative of start of listening to that station (step S44). Referring to data format shown in FIG. 9A, this data has code "5" in STATUS, the current time in TIME DATA, and the station identification code in RADIO STATION CODE. At the same time, CPU 1211 monitors the output of DC detector 1225 (step S45). If the same radio station is subsequently listened to, the output of DC detector 1225 indicates the presence of the DC detection output. However, if another radio station is selected, the DC detection output is lost due to the failure of tuning at electronic tuner 1224. Then, CPU 1211 returns the processing to step S31, to restart the scanning to identify the radio station to which car radio 11 is newly tuned.

Figure 17:
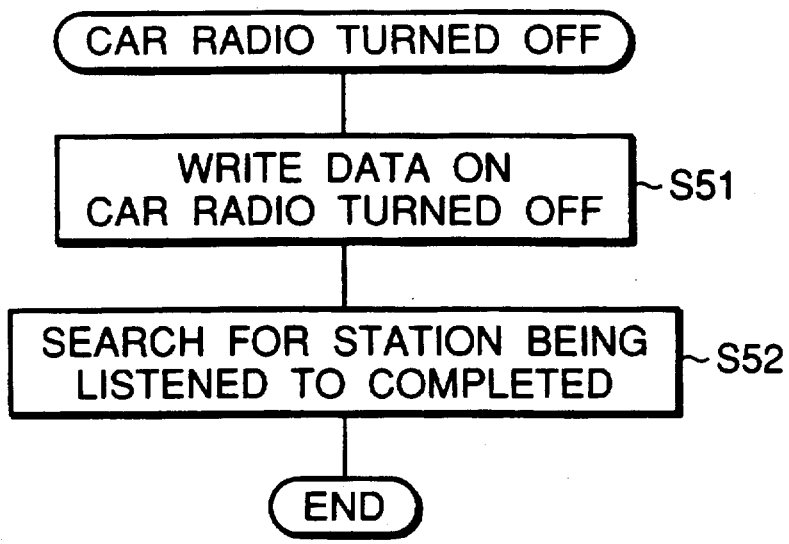
FIG. 17 shows a flow chart of data processing performed at CPU of the system control unit at the time of turning OFF of the car radio.

(8) Turning OFF of car radio:

The turning OFF of main switch MS of car radio 11 by the driver or his passenger is detected by car radio ON/OFF detector 1221 of system control unit 12, and the detection output is sent to CPU 1211. In response, CPU 1211 starts the processing shown in FIG. 17 to produce data representative of car radio OFF and writes it in measurement data storage area of RAM 1214 (step S51). In the data format shown in FIG. 9A, this data has "4" in STATUS, with the current time in TIME DATA. CPU 1211 then stops the search for a radio station being tuned (step S52).

Figure 18:
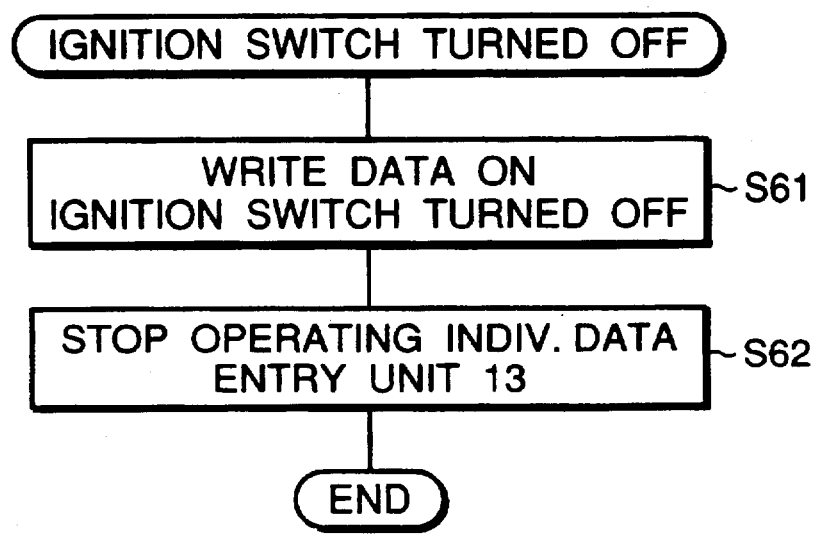
FIG. 18 shows a flow chart of data processing performed at CPU of the system control unit at the time of turning OFF of the ignition switch.

(9) Turning OFF of ignition switch:

The turning OFF of ignition switch IS is detected by occupied state detector 1218 of system control unit 12, and the detection output is supplied to CPU 1211. In response, CPU 1211 starts the processing shown in FIG. 18 to generate data representative of ignition switch OFF and writes the same data in measurement data storage area of RAM 12 (step S61). In the data format shown in FIG. 9A, this data has "2" in STATUS, with the current time in TIME DATA, and a proper code number in VEHICLE CATEGORY. CPU 1211 then sends a stop instruction to data entry unit 13 through RS488 interface device 1222 (step S62).

Upon receipt of the stop instruction through RS488 interface devices 1222 and 1320, CPU 1316 causes illuminated display device 1323 to cease illumination to enter an idle state.

Figure 19:
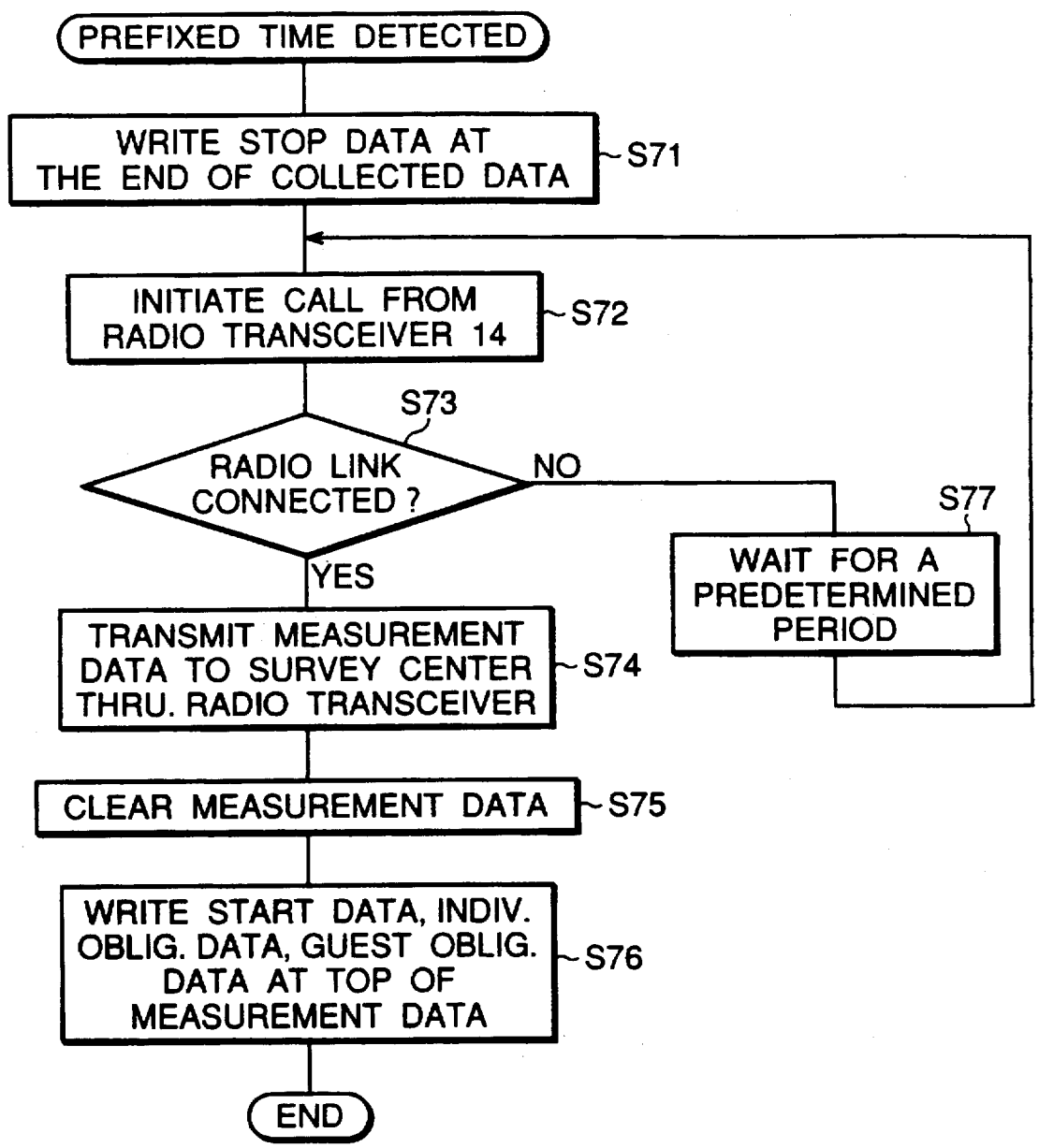
FIG. 19 shows a flow chart of data processing performed at CPU of the system control unit at the periodic transmission of collected data to the survey center.

(10) Time for transmitting the collected data to survey center:

When the fact that a preset time for transmission of collected data to survey center is reached is detected by prefixed transmission time detector 1223, the detection data is supplied to CPU 1211, which starts the processing shown in FIG. 19. Referring to the flow chart of FIG. 19, "stop" data is written at the end of the group of measurement data stored in the measurement data storage area of RAM 1214 (step S71). Referring to the data format shown in FIG. 9A, this data has "12" in STATUS, with the current time set in TIME DATA.

CPU 1211 then instructs radio transceiver unit 14 (FIG. 2) through RS 232C interface device 1220 to initiate a call (step S72). In response, radio transceiver 14 tries the initiation of a call to a predetermined MCA base station 3 and reports the result of the attempt. Upon receipt of the report of established connection (YES in step S73), CPU 1211 causes all the measurement data stored in the measurement data storage area of RAM 1214 to be sequentially transferred through RS232 interface device 1220 to radio transmitter 14 for transmission to MCA base station 3 (step S74). After completion of the transmission, latest data on individual and/or guest who used the automobile are retrieved out of the measurement data stored in the measurement data storage area of RAM 1214 and the retrieved data are retained and written, after clearing the measurement data storage area (step S75), at the leading end portion of the measurement data storage area. Then, based on the retained data on the use of the automobile by the individuals or guests, CPU 1211 writes the individual's obligatory data and guest's obligatory data (step S76). In the format shown in FIG. 9A, this data has "11" in STATUS, with the current time in TIME DATA. Similarly, individual's obligatory data has "13" in STATUS, with the current time in TIME DATA, and the individual's identification number portion of the above-mentioned retained data in INDIVIDUAL IDENTIFICATION NUMBER. Also, guest's obligatory data has "14" in STATUS, with current time in TIME DATA, and the guest's identification number portion and the guest attributes portion of the retained data in GUEST IDENTIFICATION NUMBER and GUEST ATTRIBUTES, respectively. These individual's obligatory data and guest's obligatory data are generated in number correspondingly to the number of data on individuals and guests getting on the automobiles.

If the attempted call initiation failed (NO in step S73) due to the automobile being parked in an underground parking garage or being far out from base station 3 presenting a certain difficulty in forming a radio link, a certain "wait" period is provided (step S77) for another attempt after the lapse of the wait period.

FIG. 20 shows an example of a group of data stored in the measurement data storage area of RAM 1214. As shown in the drawing, at the top of the storage area is stored a "start" data immediately after the last periodic transmission of previously stored data, followed by individual's obligatory data and guest's obligatory data. They are followed by data on the turning ON of ignition switch IS, individuals getting on, guest's getting on, turning ON of the car radio, the beginning of the state in which car radio 11 is tuned to a certain radio station, another beginning of the state tuned to another radio station, the guest's getting off, the beginning of still another state tuned to still another radio station, turning OFF of car radio 11, turning OFF of ignition switch IS, and so forth, corresponding to the respective events. At the end of the transmission of data this time, a "stop" data is stored to indicate the end of a data block to be transmitted at one time.

Figure 21:
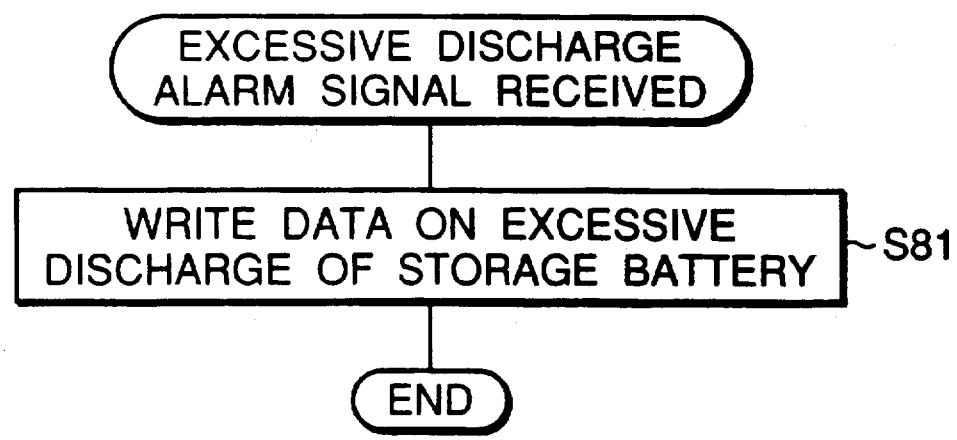
FIG. 21 shows a flow chart of data processing performed at CPU of the system control unit upon receipt of an alarm signal indicating the excessive discharge of storage battery.

(11) Excessive discharge of storage battery:

The lowering of the output voltage of rechargeable battery 154 of power supply unit 15 below a predetermined lower limit causes voltage comparator 157 to provide excessive discharge alarm signal to system control unit 12. In response to the alarm signal received through I/O interface device 1217, CPU 1211 generates data representative of the excessive discharge as shown in FIG. 21 and writes the generated data in the measurement data storage area of RAM 1214 (step S81). Referring to the data format shown in FIG. 9A, this data has "16" in STATUS, with the current time in TIME DATA. The data written in the manner described above is transmitted with other measurement data, in the next round of transmission, to the survey center through MCA base station 3.

Figure 22:
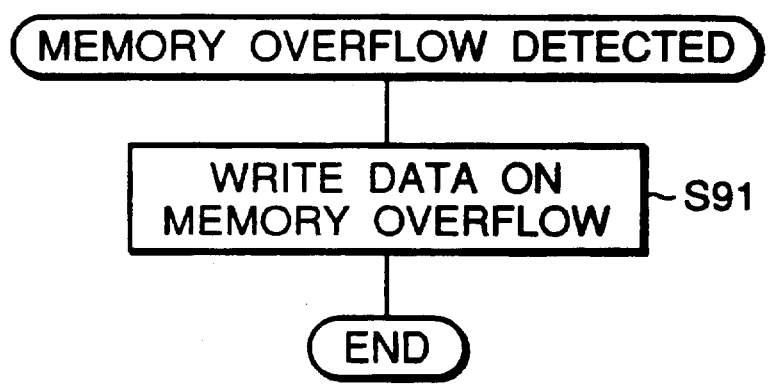
FIG. 22 shows a flow chart of data processing performed at CPU of the system control unit when the vacant memory locations for accumulated data become insufficient.

(12) Memory in overflow state:

While sufficient amount of memory area is assigned for the measurement data storage in RAM 1214, the rest of memory area reserved for measurement data becomes insufficient, when the selection of radio stations is tried too frequently, for example. With the remaining vacant memory area reserved for measurement data becoming insufficient, data representative of memory overflow is generated and written in the measurement data area of RAM 1214 as shown in FIG. 22 (step S91). Referring to the data format shown in FIG. 9A, this data has "15" in STATUS, with the current time in TIME DATA.

As described above, the use status monitoring apparatus 1 of the present invention makes it possible to record the length of idle time, i.e., the length of time in which the car radio 11 could have been turned ON but actually was not, owing to the occupied state detector 1218 and the car radio ON/OFF state detector 1221. Also, owing to the individual data entry unit 13 and remote control unit 16, the apparatus of this invention makes it possible to collect various data on the state of use of car radio 11 on an individual by individual basis rather than on a vehicle by vehicle basis. Moreover, the provision of rechargeable battery 154 separately from vehicle-mounted storage battery B for powering use status monitoring apparatus 1, and of means for providing excessive discharge alarm signal prevents the undesirable excessive discharge of vehicle-mounted storage battery B and permits the transmission of timely information to survey center in case of the excessive discharge of rechargeable battery 154. Furthermore, the local oscillation-based identification of the radio station to which car radio 11 is tuned enhances the reliability of the station identification, because the detection is not adversely affected in any way by sounds or noises from the environment.

While the invention has been described in conjunction with its preferred embodiment, it is to be understood that the invention is not limited to the disclosed embodiment. On the contrary, the invention is intended to cover various modifications and equivalent arrangements included within the spirit and scope of the appended claims.

What is claimed is:

1. An apparatus for monitoring the status of use of a car radio, said apparatus being mounted on a mobile vehicle adjacently to said car radio capable of being tuned one by one to a group of radio stations located in geographical districts including a target district to be covered by radio audience survey based on said status of use, said apparatus comprising:

a first means for detecting the state in which said vehicle is occupied at least by a driver and for measuring the length of time in which said car radio could be turned ON;

a second means for inputting data identifying said driver and other individuals expected to use said vehicle;

a third means for detecting the ON and OFF states of said car radio, thereby measuring the length of time in which said car radio was in the ON state;

a fourth means for identifying a radio station to which said car radio is tuned;

a fifth means for storing measurement data including data supplied from said first, second, third and fourth means;

a sixth means for periodically transmitting said measurement data to a survey center through a radio link; and a seventh means for supplying power to all of said first, second, third, fourth, fifth and sixth means separately from a storage battery mounted on said vehicle for energizing engine starter thereof.

2. An apparatus according to claim 1, wherein said first means includes means for detecting the ON state of the ignition switch of said vehicle, and clock means for specifying time during which said ignition switch was in the ON state.

3. An apparatus according to claim 1, wherein said first means includes means for emitting and receiving infrared rays at least across the area above the driver's seat of said vehicle, and clock means for specifying time during which said infrared rays were intercepted.

4. An apparatus according to claim 1, wherein said second means includes: a first group of pushbutton switches preassigned one by one to a group of individuals expected to use said mobile vehicle; annunciator means for generating a predetermined audible signal to prompt data entry by depression of said pushbutton switches upon receipt of detection output from said first means; and means for illuminating said pushbutton switches in blinking manner during the period said audible signal is generated and in steady manner once said data entry has been completed.

5. An apparatus according to claim 4, wherein said second means further includes: a second group of pushbutton switches assigned to guests other than said group of individuals; and a remote control unit having a third group of pushbutton switches assigned to possible attributes of said guests, and infrared rays emitting means responsive to said third group of pushbutton switches for transmitting data one said attributes to said second means.

6. An apparatus according to claim 2, wherein said seventh means includes a rechargeable battery, a battery charger for charging said rechargeable battery while said ignition switch is in the ON state, and means responsive to the lowering of the output voltage of said rechargeable battery to a value below a predetermined value for providing excessive discharge alarm signal which constitutes a part of said measurement data.

7. An apparatus according to claim 1, wherein said fourth means includes: means located adjacently to the tuner portion of said car radio for picking up a part of local oscillation energy for AM and FM reception thereof, a voltage controlled electronic tuner tunable to frequencies of said local oscillation supplied from said picking up means in response to a tuning control voltage, and means for identifying said radio station based on the presence of the output of said electronic tuner.

8. An apparatus according to claim 7 further comprising an eighth means coupled with said fourth means for changing said tuning control voltage in such a manner that radio stations located in said target district may be surveyed first, followed by relay stations located in said target district, and then other radio stations located outside said target district.

9. An apparatus according to claim 1, wherein said sixth means is adapted to make the periodic transmission of said measurement data at predetermined times and, if the transmission is not completed due to failure to establish said radio link with said survey center, to repeat the transmission after the lapse of a predetermined period of time.

10. An apparatus according to claim 8, wherein said sixth means is adapted to make the periodic transmission of said measurement data at predetermined times and, if the transmission is not completed due to failure to establish said radio link with said survey center, to repeat the transmission after the lapse of a predetermined period of time.

* * * * *